United States Patent [19]

Pilolla

[11] Patent Number: 4,832,077
[45] Date of Patent: May 23, 1989

[54] FILTERED STOP

[75] Inventor: Joseph J. Pilolla, Elmhurst, Ill.

[73] Assignee: Sloan Valve Company, Franklin Park, Ill.

[21] Appl. No.: 166,467

[22] Filed: Mar. 10, 1988

[51] Int. Cl.⁴ .................................... B01D 35/02
[52] U.S. Cl. .......................... 137/549; 137/614.2; 251/174; 251/292; 210/234; 210/429
[58] Field of Search ............... 137/549, 625.31, 614.2; 251/128, 174, 208, 292, 368; 210/234, 429

[56] References Cited

U.S. PATENT DOCUMENTS

| | | | |
|---|---|---|---|
| 549,653 | 11/1895 | Paulus | 210/429 X |
| 1,569,644 | 1/1926 | Taylor | 251/292 |
| 1,613,166 | 1/1927 | Gregory | 210/429 |
| 2,263,977 | 11/1941 | Brackett | 137/614.2 |
| 2,533,931 | 12/1950 | Hartley | 251/174 |
| 2,832,561 | 4/1958 | Holl | 251/174 |
| 3,094,145 | 6/1963 | Chernak et al. | 137/614.2 |
| 3,746,171 | 7/1973 | Thomsen | 210/234 |
| 3,831,621 | 8/1974 | Anthony et al. | 137/625.31 X |
| 4,529,515 | 7/1985 | Selz | 210/234 |

Primary Examiner—John Rivell
Attorney, Agent, or Firm—Kinzer, Plyer, Dorn, McEachran & Jambor

[57] ABSTRACT

A filtered stop including a seal assembly having a rotary seal member with flow ports and a stationary seal member with corresponding flow ports, the rotary seal member being selectively positionable by indexing means which are operable from outside the stop so that the flow ports of the rotary seal member may be positioned either into or out of alignment with the ports of the stationary seal member to automatically shut off the flow of fluid before removal of the filter can be accomplished.

15 Claims, 3 Drawing Sheets

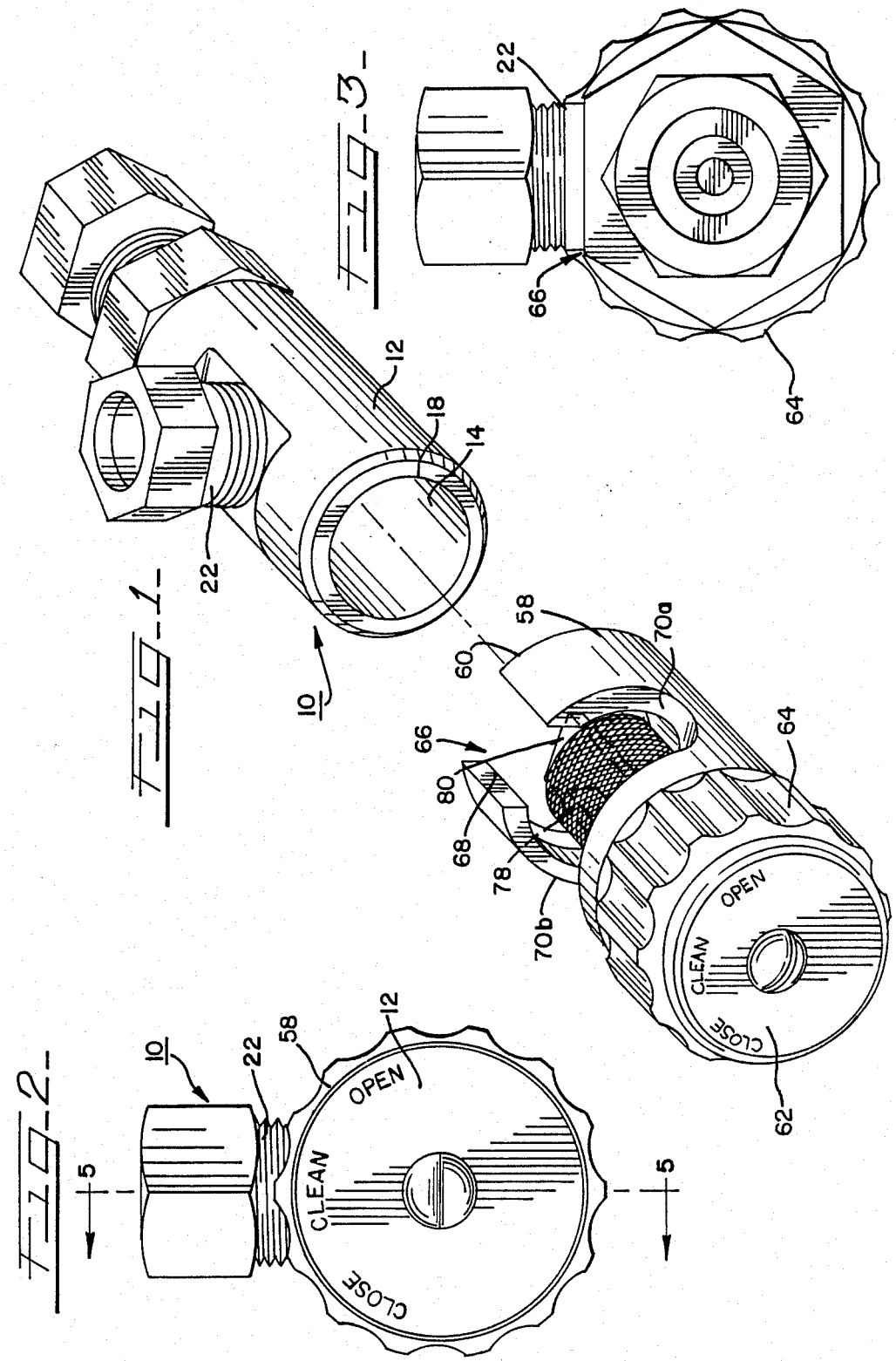

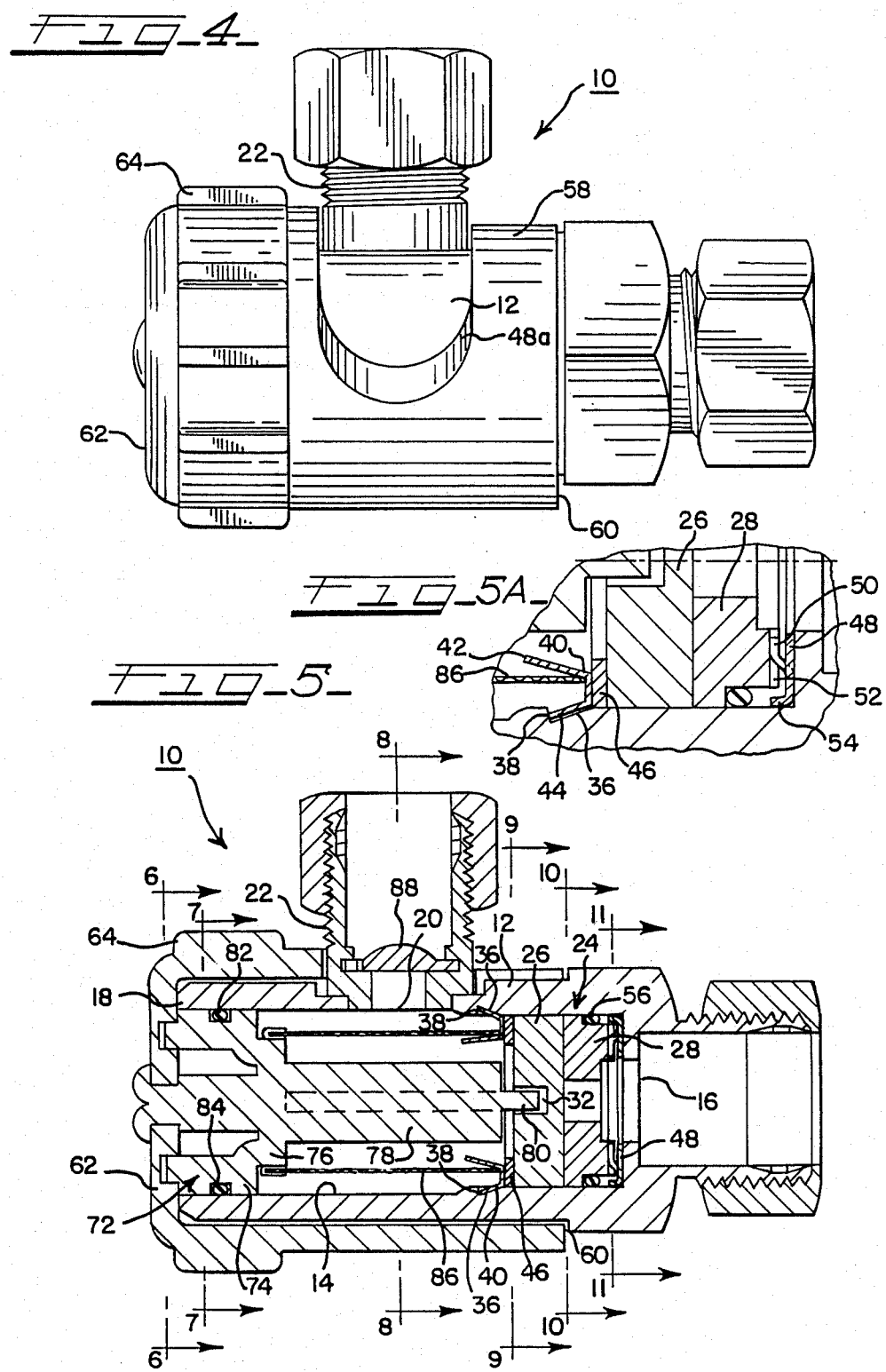

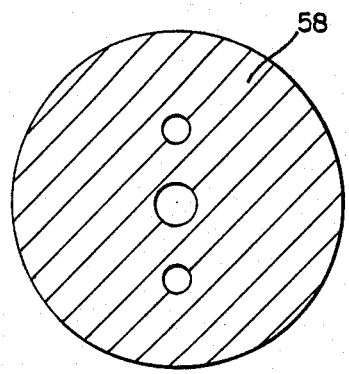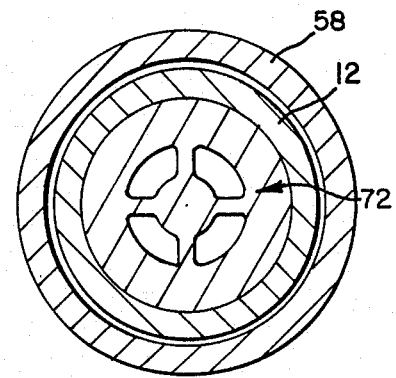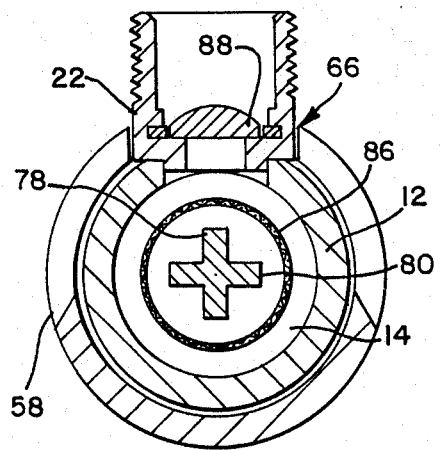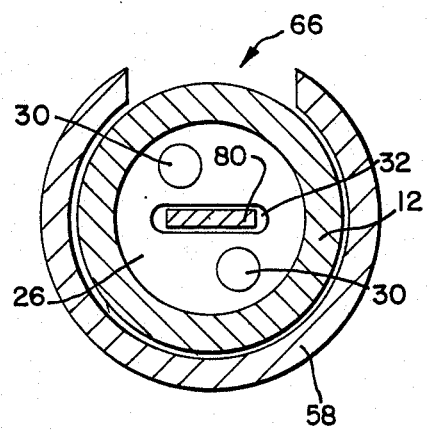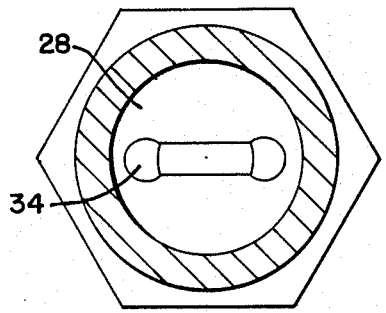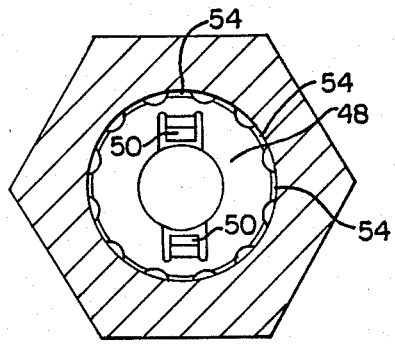

FILTERED STOP

BACKGROUND OF THE INVENTION

The present invention provides a filtered stop which seals against the flow of fluid through the stop when the filter is removed for cleaning or replacement. Numerous arrangements of this general type are shown in the prior art U.S. Pat. Nos. 1,898,816, 2,630,920, 3,748,837, Canadian patent No. 1,026,685 and German patent No. 2,802,948. Although some of the prior art patents show mechanisms to ensure sealing prior to filter removal, these mechanisms utilize a sealing arrangement which allows contaminants to lodge between the seal and seal face during sealing engagement. When this occurs, the cap for the filter housing is removed and water continues to flow out of the chamber.

SUMMARY OF THE INVENTION

The present invention provides a filtered stop incorporating a two-piece rotary seal assembly which automatically seals against the flow of fluid when the filter screen is to be removed. The seal assembly includes a rotary seal member with one or more flow ports and a stationary seal member having corresponding flow ports, the rotary seal member disposed adjacent to and in face contact with the stationary seal member to prevent the entrance of contaminants therebetween. Indexing means connected to the rotary seal member from outside the housing of the stop is provided to selectively position the ports of the rotary seal member either into or out of alignment with the flow ports of the stationary seal member. When removal of the filter is desired, the indexing means is oriented to seal against fluid flow to enable removal of the filter.

BRIEF DESCRIPTION OF THE DRAWINGS

FIG. 1 shows a perspective view of the filtered stop of the present invention with the sleeve member separated from the housing.

FIG. 2 shows an end view from the left end of the filtered stop shown in FIG. 5.

FIG. 3 shows an end view from the right end of the filtered stop shown in FIG. 5.

FIG. 4 shows a side view of the assembled filtered stop.

FIG. 5 shows a sectional view of the filtered stop depicted in FIG. 4.

FIG. 5A shows an enlarged sectional view of a portion of the device shown in FIG. 5.

FIG. 6 shows a cross-sectional view of the filtered stop in FIG. 5 taken along lines 6—6.

FIG. 7 shows a cross-sectional view of the filtered stop in FIG. 5 taken along lines 7—7.

FIG. 8 shows a cross-sectional view of the filtered stop in FIG. 5 taken along lines 8—8.

FIG. 9 shows a cross-sectional view of the filtered stop in FIG. 5 taken along lines 9—9.

FIG. 10 shows a cross-sectional view of the filtered stop in FIG. 5 taken along lines 10—10.

FIG. 11 shows a cross-sectional view of the filtered stop in FIG. 5 taken along lines 11—11.

DETAILED DESCRIPTION OF THE INVENTION

A filtered stop, generally indicated by the numeral 10, is illustrated in FIGS. 1-5. The stop 10 includes a substantially cylindrical housing 12 defining a filter chamber 14 therein. The housing 12 is provided with a fluid inlet 16 at one end, an opening 18 at the end opposite the inlet 16 and a fluid outlet 20. A fitting 22 is connected into the housing 12 adjacent the fluid outlet 20.

A seal assembly 24 is disposed in the housing 12 between the inlet 16 and the filter chamber 14. The seal assembly 24 consists of two parts, namely, a rotary seal member 26 rotatable within the housing 12 and a stationary seal member 28 nonrotatably secured to the housing 12.

Both seal members 26 and 28 are generally cylindrical discs which include spaced, parallel planar radial faces. The adjacent faces of the rotary seal member 26 and the stationary seal member 28 are disposed in face-to-face contact. The surfaces of the faces are polished to such a degree that this face-to-face contact seals against the flow or leakage of fluid or the entrance of contaminants between these mating faces. The discs of the seal assembly 24 are preferably of ceramic, however, it is contemplated that other materials, such as plastic, carbon graphite, or stainless steel could be utilized as well.

The rotary seal member 26 has a pair of flow ports 30, as shown in FIG. 9, defined therethrough and a slot 32 formed in the back thereof. Although two ports 30 are illustrated, the actual number and size of the ports may vary depending upon the flow conditions of the application. The stationary seal member 28 also has a pair of flow ports 34, as shown in FIG. 10, defined therethrough which correspond with the ports 30. The flow ports 30 of the rotary seal member 26 are arranged relative to the flow ports 34 of the stationary seal member 28 such that rotation of the rotary seal member 26 varies the size of the orifice defined by the alignment of the corresponding flow ports 30 and 34 of the rotary seal member 26 and the stationary seal member 28, respectively.

A notched recess 36 defining an abutment 38 is formed about the circumference o the inner wall of the housing 12 to the left of the rotary seal member 26 as viewed in FIGS. 5 and 5A. A substantially annular retainer ring 40 having an inner wall 42 and a resilient outer wall 44, is adapted to be snapped into the recess 36 such that the resilient outer wall 44 conforms to the recess 36. A teflon thrust washer 46 is disposed between the rotary seal member 26 and the retainer ring 40 to provide pre-load on the seal assembly 24 as will be understood.

A washer 48 prevents relative rotation between the stationary seal member 28 and the housing 12. As seen in FIGS. 5, 5A and 11, the washer 48 is provided with a pair of opposing primary spring fingers 50 which depend outwardly from the washer 48 and are adapted to be received in corresponding slots 52 defined in the back of stationary seal member 28. The spring fingers 50 create a biasing effect against the seal assembly 24 urging it against thrust washer 46 to create the necessary preload on the seal assembly 24. A seal 56, shown in FIG. 5 as a rubber O-ring, is disposed between the stationary seal member 28 and the housing 12 to prevent leakage.

A plurality of secondary spring fingers 54, shown in FIGS. 5A and 11, also substantially U-shaped, are provided about the periphery of the washer 48 at the outer edge thereof. Fingers 54 engage the bore in the housing 12 and hold the washer 48 and member 28 against rotation.

In assembling the various aforementioned components into the housing 12, the washer 48 is inserted first. Then the seal 56, the stationary seal member 28, the rotary seal member 26, the thrust washer 46 and finally, the retainer ring 40. Pressure is exerted on the retainer ring 40, thereby compressing the spring fingers 50 until the outer wall 44 of the retainer ring 40 snaps into and conforms to the notched recess 36. With the outer wall 44 secured in the recess 36, the upper edge of the wall 44 contacts the abutment 38. The biasing effect of the spring fingers 50 against the seal assembly 24 helps to hold the retainer ring 40 in place and makes assembly easy and efficient.

A substantially cylindrical sleeve member 58, open at one end 60 and closed at the other 62, is best illustrated in FIG. 1. A grip surface 64 is formed on the outer wall of the sleeve member 58 toward the closed end. The sleeve member 58 is longitudinally slidable over the exterior of the housing 12 and relatively rotatable with respect thereto. A substantially T-shaped channel 66, defining a leg 68 and two opposing arms 70a and 70b as best shown in FIG. 1, is provided in the sleeve member 58 and is adapted to act in cooperation with the fitting 22 on the housing 12 to provide a locking mechanism which will be described below. The channel 66 begins at the open end 60 of the sleeve member 58 such that the base of the leg 68 of the channel 6 is also open.

Rigidly secured to the inner face of the closed end 62 of the sleeve member 58 is a substantially cylindrical plug member 72 sized to provide enough room between it and the inner wall of the sleeve member 58 to accommodate the housing 12. The plug member 72 includes an annular barrel 74 rotatably nested inside the end of filter chamber 14 and defines a platform 76 with a stem member 78 terminating in a rectangular indexing member 80. A seal 82 is shown disposed in a groove 84 formed in the barrel 74. The indexing member 80 is adapted to coact with the slot 32 in the rotary seal member 26 in the same manner as a screwdriver and screw head to rotate the rotary seal member 26 and vary the alignment between the flow ports 30 of the rotary seal member 26 and the flow ports 34 of the stationary seal member 28.

A hollow cylindrical filter 86, adapted to remove impurities from the fluid passing through the stop 10, is removably disposed about the platform 76 such that the stem 78 and indexing member 80 are located in the center. The filter 86 extends almost the length of the stem 78 and seats in the retainer ring 40. A check valve 88 is provided in the fitting 22 to permit flow from the inlet 16 through the outlet 20, but to block any reverse flow from the outlet 20 into the chamber 14.

The operation of the filtered stop of the present invention is as follows. The sleeve member 58 is assembled about the housing 12 by positioning the open end 60 of the sleeve member 58 over the opening 18 in the housing 12 so that the open-ended leg 68 of the T-shaped channel 66 is aligned with the fitting 22 extending from the housing 12. The sleeve member 58 is then slid longitudinally over the housing 12 until the fitting 22 is centrally positioned between the opposing arms 70a and 70b of the T-shaped channel 66 as shown in FIGS. 4 and 5. The barrel 74, stem 78, indexing member 80 and the filter 86 are all positioned as a removable unit within the filter chamber 14 as shown in FIG. 5. In this position, the indexing member 80 lies within the slot 32 in the rotary seal member 26. The filter 86 is disposed between the inlet 16 and the outlet 20 to prevent impurities in the fluid entering through the inlet 16 from exiting through the outlet 20.

In the "clean" position illustrated in FIG. 2, the flow ports 30 and 34 are out of alignment. When the sleeve member 58 is rotated counterclockwise from the position of FIG. 2 to the "open" position, the fitting 22 is located in arm 70a of channel 66. The stem member 78 and consequently the indexing member 80 rotate counterclockwise, also. Rotation of the indexing member 80 causes the rotary seal member 26 to rotate counterclockwise, so that the flow ports 30 in the rotary seal member 26 align with the flow ports 34 in the stationary seal member 28. In addition, rotating the sleeve member 58 counterclockwise locks the sleeve member 58 over the housing 12 so that it will not slip off. The amount of fluid permitted to flow through the ports 30, 34 can be controlled by varying the degree of rotation and alignment of the ports such that if the sleeve member 58 were rotated 45° with respect to the fitting 22, the flow of fluid would not be as great as if the sleeve member 58 were rotated 60°.

When it is desired to utilize the filtered stop simply as a shut-off valve to prevent the flow of fluid through the stop 10 without removal of the filter 86, the sleeve 58 is rotated clockwise to the "close" position. The flow ports 30 in the rotary seal member 26 are rotated out of alignment with the flow ports 34 in the stationary seal member 28.

When it becomes necessary to clean or replace the filter 86, the present arrangement provides an automatic shut-off mechanism before the filter 86 can be removed. This prevents inadvertent removal of the sleeve 58 prior to flow shut-off which would result in a major fluid leak. For filter removal, the sleeve member 58 is rotated to the "clean" position illustrated in FIG. 2 so that the fitting 22 is centrally located between the arms 70a and 70b of the T-shaped channel 66 and the fitting 22 is located at the top of the leg 68 of the T-shaped channel 66. The flow of fluid into the filter chamber 14 is sealed since the flow ports 30, 34 are no longer aligned. The face-to-face sealing relationship between the seal members 26 and 28 ensures against leakage due to contaminants in the sealing area. The sleeve member 58 may then be slid off the housing 12, removing the filter 86 from the filter chamber 14 so that it may be cleaned or replaced. The check valve 88 disposed between the outlet 20 and the filter chamber 14 blocks the flow of fluid from the outlet 20 into the filter chamber 14 during removal of the filter 86. This prevents leakage from the stop resulting from a head of water in communication with the outlet 20. After the filter 86 is cleaned or replaced and repositioned, the sleeve member 58 may be slid back over the housing 12 and secured thereto by rotating it either clockwise or counterclockwise as desired.

Thus it has been shown that the present invention provides a filtered stop which automatically seals against the flow of fluid when the filter screen is removed from the filter chamber of the housing.

Various features of the invention have been particularly shown and described in connection with the illustrated embodiment of the invention, however, it must be understood that these particular arrangements merely illustrate and that the invention is to be given its fullest interpretation within the terms of the appended claims.

What is claimed is:

1. A filtered stop including a housing, a fluid inlet defined in said housing, a fluid outlet defined in said housing, a filter chamber defined in said housing in communication with said inlet and said inlet, a filter removably disposed in said chamber between said inlet and said outlet, said filter adapted to remove impurities from fluid passing through said stop, a seal assembly disposed in said housing between said inlet and said outlet, said seal assembly including a stationary seal member nonrotatably mounted mounted with respect to said housing, said stationary member defining one or more flow ports therethrrough and a rotary seal member disposed adjacent to and in face contact with said stationary seal member, said rotary seal member defining one or more ports therethrough, indexing means connected to said rotary seal member including a sleeve member longitudinally slidable over the exterior of said housing and relatively rotatable with respect thereto and a stem member extending from said sleeve member and connectable to rotary seal member for selective positioning thereof and being operable from outside said housing to selectively position said ports of said rotary seal member either into or out of alignment with said ports of said stationary seal member whereby said filtered stop is arranged such that when said ports of said stationary and rotary seal members are in alignment, fluid is allowed to flow from said inlet through said filter and from said outlet, nut in order to remove said filter from said filter chamber, said ports of said stationary and rotary seal members must be positioned out of alignment to block the flow of fluid from said inlet thereby enabling the removal of said filter from said housing without fluid flow.

2. A filtered stop as in claim 1 in which said seal assembly is positioned between said inlet and said filter chamber.

3. A filtered stop as in claim 1 including a locking mechanism associated with said sleeve and said housing operable to secure said sleeve in either a first or a second position with respect to said housing whereby when said sleeve is rotated to said first position, said ports of said fixed and rotary seals are aligned and when said sleeve is rotated to said second position, said ports are out of alignment.

4. A filtered stop as in claim 3 in which said locking mechanism includes a channel defined in said sleeve and a projection extending from said housing said sleeve positionable in a third position with said channel of said sleeve aligned with said projection on said housing, said sleeve being movable longitudinally over or off of said housing whereby removal of said sleeve from said housing exposes said chamber for removal of said filter.

5. A filtered stop as in claim 1 including a check valve disposed between said outlet and said filter chamber to block the flow of fluid from said outlet into said filter chamber during removal of said filter.

6. A filtered stop as in claim 1 in which said ports of said rotary and stationary seal members are arranged such that relative rotation of said seal members between predetermined points varies the size of the orifice defined by the alignment of corresponding ports of said rotary and stationary seal members.

7. A filtered stop as in claim 3 in which said housing defines an opening for removal of said filter, which opening is sealed by said sleeve member of said indexing means when said sleeve is secured in said first or second position.

8. A filtered stop as in claim 1 in which said stationary seal member of said seal assembly has a pair of opposing slots formed in the rear face thereof.

9. A filtered stop as in claim 8 including a washer disposed in said housing between said stationary seal member and said housing, said washer having a pair of opposing primary spring fingers extending from said washer adapted to engage said slots in said rear face of said stationary seal member to provide a resilient biasing effect with respect to said seal assembly.

10. A filtered stop as in claim 8 in which said washer has a plurality of secondary spring fingers disposed about and extending from the outer edge of the periphery of said washer to provide additional resilient biasing with respect to said seal assembly.

11. A filtered stop as in claim 1 in which a thrust washer is disposed within said housing rearwardly of said rotary seal member to provide pre-load on said seal assembly.

12. A filtered stop as in claim 1 including a notched recess defined about the inner circumference of said housing rearwardly of said thrust washer, said recess defining an abutment and adapted to receive a retainer ring.

13. A filtered stop as in claim 12 in which said retainer ring includes an inner wall and a resilient outer wall, said outer wall adapted to snap into conformity with the contours of said recess, such that the upper edge of said outer wall contacts said abutment locking said retainer ring in said recess and preventing said washer, said seal assembly and said thrust washer from slipping out of said housing.

14. A filtered stop as in claim 1 in which said stationary seal member and said rotary seal member are formed of ceramic material.

15. A filtered stop as in claim 1 in which rotation of said indexing means from a position in which said ports of said seal members are out of alignment to a position in which said ports are in alignment constitutes a rotation of less than one hundred eighty degrees.

* * * * *